(12) United States Patent
Xavier et al.

(10) Patent No.: US 11,565,242 B2
(45) Date of Patent: Jan. 31, 2023

(54) METHOD FOR PREPARING CATALYST FOR SELECTIVE HYDROGENATION OF DIOLEFINS

(71) Applicant: INDIAN OIL CORPORATION LIMITED, Mumbai (IN)

(72) Inventors: Kochappilly Ouseph Xavier, Faridabad (IN); Ramasubramanian Kanthasamy, Faridabad (IN); Alex Cheru Pulikottil, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

(*) Notice: Subject to any disclaimer, the term of this patent is extended or adjusted under 35 U.S.C. 154(b) by 200 days.

(21) Appl. No.: 17/085,959

(22) Filed: Oct. 30, 2020

(65) Prior Publication Data

US 2021/0138440 A1    May 13, 2021

(30) Foreign Application Priority Data

Nov. 13, 2019  (IN) .............................. 201921046169

(51) Int. Cl.
  *B01J 23/88* (2006.01)
  *B01J 23/888* (2006.01)
  (Continued)

(52) U.S. Cl.
  CPC ....... *B01J 23/8885* (2013.01); *B01J 35/1019* (2013.01); *B01J 35/1042* (2013.01); *B01J 35/1066* (2013.01); *B01J 37/0205* (2013.01); *B01J 37/0207* (2013.01); *B01J 37/0209* (2013.01); *B01J 37/0213* (2013.01); *C10G 29/28* (2013.01); *C10G 45/38* (2013.01); *B01J 21/04* (2013.01); *C10G 2300/70* (2013.01)

(58) Field of Classification Search
  CPC . B01J 21/04; B01J 23/88; B01J 23/883; B01J 23/8885; B01J 35/1019; B01J 35/1042; B01J 35/1066; B01J 35/109; B01J 27/0203; B01J 27/0205; B01J 27/0207; B01J 27/0209; B01J 27/0213; C10G 29/28; C10G 45/08; C10G 45/38; C10G 2300/70
  See application file for complete search history.

(56) References Cited

U.S. PATENT DOCUMENTS 6,686,309 B1   2/2004   Didillon et al.
7,453,016 B1   11/2008  Gajda
(Continued)

FOREIGN PATENT DOCUMENTS

EP   1800748 A2   6/2007
EP   2962753 A1   1/2016

OTHER PUBLICATIONS

English language translation of Kumagai et al, JP 3981632, published Sep. 26, 2007.*

*Primary Examiner* — Brian A Mccaig
(74) *Attorney, Agent, or Firm* — Maschoff Brennan

(57) ABSTRACT

The present invention relates to a catalyst and a method for preparation of that catalyst for the selective hydrogenation of diolefins present in gasoline streams along with the shifting of lighter sulfur compounds in the feed stock to heavier sulfur compound by the reaction with olefinic compounds.

17 Claims, 1 Drawing Sheet

(51) Int. Cl.
  *B01J 35/10* (2006.01)
  *B01J 37/02* (2006.01)
  *C10G 29/28* (2006.01)
  *C10G 45/38* (2006.01)
  *B01J 21/04* (2006.01)

(56) References Cited

U.S. PATENT DOCUMENTS

| | | |
|---|---|---|
| 7,550,636 B2 | 6/2009 | Picard et al. |
| 7,645,376 B2 | 1/2010 | Bouchy et al. |
| 7,718,053 B2 | 5/2010 | Bouchy et al. |
| 7,736,492 B2 | 6/2010 | Bouchy et al. |
| 10,058,852 B2 | 8/2018 | Daudin |
| 2007/0170098 A1 | 7/2007 | Bouchy et al. |
| 2011/0305602 A1* | 12/2011 | Nicholas .............. C10G 57/005 422/142 |
| 2014/0349844 A1 | 11/2014 | Liang et al. |
| 2015/0144529 A1* | 5/2015 | Roy-Auberger ......... B01J 27/19 208/89 |
| 2015/0175910 A1 | 6/2015 | Touzalin et al. |
| 2019/0126254 A1* | 5/2019 | Medellín Rivera .. B01J 37/0209 |

* cited by examiner

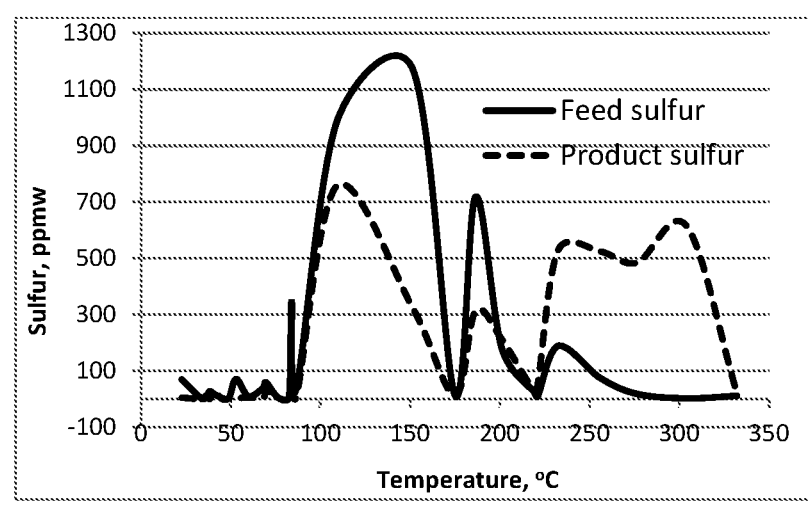

METHOD FOR PREPARING CATALYST FOR SELECTIVE HYDROGENATION OF DIOLEFINS

FIELD OF THE INVENTION

The present invention provides a catalyst and a method for preparation of that catalyst for the selective hydrogenation of diolefins present in gasoline streams along with the shifting of lighter sulfur compounds in the feed stock to heavier sulfur compound by the reaction with olefinic compounds. The said catalyst comprises of about 5 to 15 wt % group VIB metal as oxide and about 0.5 to 5.0 wt % of group VIII metal as oxide supported on a gamma-alumina support.

BACKGROUND OF THE INVENTION

The environmental regulations implemented world over mandate the production of gasoline with substantially reduced sulfur content preferably lower than 10 parts per million (ppm). The gasoline pool in a refinery, mainly constituted by naphtha streams produced by cracking processes like fluidized catalytic cracking and coking, has high level of olefins and sulfur present in it. The coker naphtha, in particular, is known to have several times more sulfur and higher olefin contents as compared with straight-run naphtha. The undesirable sulfur is generally removed by selectively hydro-treating the naphtha streams in a fixed bed reactor without hydrogenating the olefins to avoid significant loss of octane of the gasoline pool.

The naphtha streams from the cracking units also contain diolefins, typically in the range 1-6% by weight. These diolefins, in particular the conjugated diolefins, are highly unstable and readily polymerize to form gum over the hydrotreating catalyst. The gums can be converted into coke over a period of operation, leading to activity loss due to pore blockage and masking of the active sites of the catalyst. In addition, the coking of catalyst also results in the increase of pressure drop across the bed and eventually causes shut down of the unit at a shorter cycle length. Therefore, the diolefins in the naphtha streams are to be hydrogenated to stabilize the feedstock prior to hydrotreatment of the naphtha streams. However, the diolefin saturation process should be highly selective such that only the diolefins are hydrogenated retaining the olefins so as to restrict the consumption of hydrogen and octane loss of the naphtha streams.

It is desirable that the selective diolefin hydrogenation process is also associated with the conversion of light sulfur compounds to heavy sulfur compounds by reacting with olefins. The sulfur compounds with boiling point lower than thiophene are considered as light sulfur compounds and combination of such compounds with olefins forms heavier sulfur compounds with increased boiling point, leading to enrichment of sulfur in the heavier fraction. This enables to desulfurize the lighter fraction, maintaining at the same time its octane by the retaining largely the mono-olefins containing in it. The lighter fraction can therefore be separated from the heavier fraction and the heavy fraction containing majority of the sulfur compounds can be subjected to hydrotreatment. The lighter fraction can be directly mixed with the desulfurized heavier fraction to obtain the final gasoline product.

There is need for efficient catalyst systems for the hydrogenation of diolefins with increased selectivity so that only diolefins are selectively get hydrogenated and the octane loss by hydrogenation of olefins is substantially limited. The present invention mainly relates to a method of preparation of a catalyst, which is highly active and selective for the hydrogenation of diolefins present in gasoline streams. Further, the catalyst prepared according the current invention also has features to activate the combination reactions of lighter sulfur compounds with olefinic compounds to shift them to the heavier fraction.

PRIOR ART

The literature widely reports the use of catalyst formulations based on noble metals for selectively hydrogenating diolefins to monoolefins. For example, U.S. Pat. No. 6,686,309 B1 discloses a catalyst for selective hydrogenation of diolefinic and styrenic compounds, which comprises palladium in the range 0.2% to 5% by weight and molybdenum and/or tungsten in the range 0.5% to 5.0% by weight supported on refractory oxides like alumina, silica, silica-alumina, magnesia or their mixtures, in which palladium is distributed on the periphery of the support grains. The improved performance of this catalyst over a comparative catalyst containing only palladium was exemplified with a model feedstock. The palladium based catalysts are known to have high intrinsic activity for hydrogenation reactions. However, palladium catalysts are very sensitive to the poisoning of sulfur in the feedstock and therefore such catalysts might not be preferred for processing gasoline streams. The catalyst of the present invention does not contain palladium or any other noble metals and is suitable to be used for processing sulfur containing streams.

U.S. Pat. No. 7,453,016 B1 also discloses a noble metal catalyst for selectively hydrogenating diolefins to monoolefins which comprises a inner core of refractory inorganic oxide with lower adsorptive capacity, to which an outer layer of another refractory inorganic oxide with higher adsorptive capacity is bonded and the outer layer is uniformly deposited with at least one Group X metal selected from the group consisting of platinum and palladium and at least one Group XI metal selected from the group consisting of copper and silver. Although the outer layer of thickness 50-100 micron has surface area of 50-200 $m^2/g$ based on the weight of the outer layer, the typical catalysts prepared according to this invention have total pore volume of only 0.22 ml/g and BET surface area of 64 $m^2/g$. The lower porosity of such catalyst may result in reduced life due to gum formation especially at higher operating temperature and therefore the application of this catalyst might be restricted to a narrow range of operating conditions. The catalyst of the present invention differs from above patent application in terms of not only the composition and preparation process, but also the porosity of the catalyst.

U.S. Pat. No. 7,550,636B2 relates to a process for the hydrotreatment of an olefinic gasoline comprising a selective hydrogenation stage for eliminating diolefins and partial conversion of sulfur compounds by increasing their molecular weight on a alumina based catalyst comprising of nickel or cobalt sulfide between 1% to 30% by weight as oxide and also molybdenum sulfide between 1% to 30% by weight as oxide. According to this patent application, the product of the selective hydrogenation stage is fractionated and the heavier fraction has subjected to selective hydrodesulfurization at optimized conditions. The present invention differs from above prior art catalyst primarily in the composition of the catalyst, amount of metals being in lower range in present invention, and also in terms of the profile at which metals are deposited on the support.

U.S. Pat. No. 7,718,053B2 proposes a catalyst comprising at least one group VIB metals including at least molybdenum by a content of greater than 12% by weight of oxide and at least one non-noble metal from group VIII including at least nickel by a content of less than 15% by weight of oxide deposited at a Ni/Mo mole ratio of 0.2 to 0.5 on a porous catalyst support and having a porosity such that 10% to 40% of total pore volume of the catalyst is of pores of diameter more than 0.05 micron and at most 20% of the total pore volume represents pores with diameter more than 0.1 micron. The present invention characterizes a specific porosity for the catalyst different from referred document and also differs in terms of the amount of metals loaded and profile at which they are deposited on the support.

U.S. Pat. No. 7,736,492B2 reports a process for selective hydrogenation and transforming light sulfur compounds to heavier compounds employing a catalyst comprising at least one metal from group VIB by a content of greater than 12% by weight of oxide and at least one non-noble metal from group VIII by a content of less than 15% by weight of oxide in the sulfided form supported at a Ni/Mo mole ratio of 0.25 to 0.45 on a metal aluminate support. As the metal aluminate is known to have only reduced catalytic functionalities as compared to supported metals like cobalt and nickel, the present invention does not use metal aluminates.

US2014349844A1 discloses a nickel based selective hydrogenation catalyst and its preparation method, which comprises 14-20% nickel oxide as the active component, lanthanum oxide and/or cerium oxide 2-8% and VIB element oxide 1-8%, silica 2-8%, alkaline earth metal oxide 1-8% and balance alumina. The catalyst formulation according to the present invention has different composition. Further, the above patent claims the synthesis of a modified alumina support wherein the precursors of silica and/or alkaline earth metals are mixed with alumina and calcined to form modified carrier, whereas the present invention does not employ the approach of mixing and homogenization for the modification of the alumina support.

US2015/0175910A1 relates to a process wherein the gasoline feedstock is contacted with the first catalyst comprising at least one metal selected from the group VIII in the range 1% to 30% expressed as the weight of oxide with respect to total weight of the catalyst and at least one metal selected from the group VIB in the range 1% to 30% expressed as the weight of oxide with respect to total weight of the catalyst for demercaptanization and subsequently bringing into contact with a second catalyst comprising of at least one metal selected from the group VIII in the range 10% to 60% expressed as the weight of oxide with respect to total weight of the catalyst and palladium metal in the range 0.1% to 0.2% with respect to total weight of the catalyst for selective hydrogenation of di-olefins. Advantageously, the present invention offers a single catalyst system which is capable of carrying out demercaptanization and selective hydrogenation of diolefins simultaneously and therefore two separate catalysts as described in the reported patent are not used.

Objectives of the Present Invention

It is the primary objective of the present invention is to provide a catalyst and a method for preparing that catalyst for selective hydrogenation of diolefins.

It is the further objective of the present invention is to provide the suitable method for preparing catalyst with varying metal distribution profile in the alumina support.

It is the further objective of the present invention is to provide a catalyst which is highly active for simultaneously carrying out the selective hydrogenation of diolefins as well as combination reaction of lighter sulfur compounds with olefinic compounds.

SUMMARY OF THE INVENTION

The present invention provides a method of preparation of a catalyst for the selective hydrogenation of diolefins present in gasoline streams along with the shifting of lighter sulfur compounds in the feed stock to heavier sulfur compound by the reaction with olefinic compounds, wherein said catalyst comprises of about 5 to 15 wt % group VIB metal as oxide and about 0.5 to 5.0 wt % of group VIII metal as oxide supported on a gamma-alumina support. The method of preparation of said catalyst comprises of steps of two consecutive impregnations wherein, group VIB metal is deposited in the first impregnation and group VIII metal or a mixture of group VIII and VIB metal, along with an organic additive is deposited in the second impregnation step on the alumina support. The present invention enables to load the metals on the support surface at a varying metal concentration profile such that the pores in the alumina support with diameter greater than 120 Å are preferentially deposited with both group VIB and group VIII metals, whereas the pores with diameter lower than 120 Å contains preferentially group VIB metal, giving rise to two different types of metal active sites in the catalyst for simultaneously catalyzing hydrogenation of diolefins and combination reaction of light sulfur compounds with olefins, respectively.

Accordingly, present invention provides a catalyst for simultaneously carrying out selective hydrogenation of diolefins and conversion of light sulfur compounds to heavier sulfur compounds in the gasoline streams, wherein the catalyst comprises:

at least one metal from group VIB and at least one metal from group VIII mounted on the surface of an alumina support, and the catalyst having two types of metal active sites, wherein one active site of the catalyst comprising preferentially only group VIB metals and, another type of active site of the catalyst comprising a mixture of group VIB and group VIII metals, wherein the group VIB metals in the catalyst is in range of 5% to 15% by weight as metal oxide with respect to the total dry weight of the catalyst and the group VIII metal is in range of about 0.5% to 5% by weight as metal oxide with respect to the total dry weight of the catalyst.

In one feature of the present invention, the catalyst is having of pore volume at least 60% from the pores of diameter in the range 60-120 Å, and pore volume in the range of 10 to 20% from the pores of diameter in the range >120 Å out of total pore volume of the catalyst.

In another feature of the present invention, the active site of the catalyst comprising group VIB metal is responsible for the combination reactions of lighter sulfur compound with olefins compounds and the active site of the catalyst comprising a mixture of group VIII and group VIB metals is responsible for selective hydrogenation of the diolefins.

The present invention also provides a method for preparation of a catalyst for simultaneously carrying out selective hydrogenation of diolefins in the gasoline streams and conversion of light sulfur compounds to heavier compounds, wherein the method comprises two consecutive impregnations steps of:

(a) impregnating a solution of group VIB metal over an alumina support to obtain a first impregnated product;

(b) adding a solution of either group VIII metal alone or a mixture of group VIII metal and group VIB metal to an organic additive to obtain a metal complex; and (c) impregnating the metal complex over the first impregnated product to obtain the catalyst.

In one of the features of the present invention, the group VIB metal is selected from molybdenum and tungsten and the group VIII metal is selected from nickel and cobalt.

In another feature of the present invention, the first impregnated product of step (a) is dried at a temperature in the range of 100 to 150° C. for 8 to 12 hours.

In yet another feature of the present invention, the step (b) is carried out a temperature in the range of 60–70° C.

In yet another feature of the present invention, the catalyst obtained in step (c) is dried at a temperature in the range of 100 to 150° C. for 8 to 12 hours and then calcined at a temperature in the range of 400 to 500° C. for 2 to 4 hours.

In still another feature of the present invention, the organic additive to group VIII metal molar ratio is in a range of 0.1-2.0.

In still another feature of the present invention, the organic additive is selected from nitrilotriacetic acid (NTA), ethylene diamine tetraacetic acid (EDTA) and ethylene dinitrilotetraacetic acid.

In yet another feature of the present invention, the solution of group VIB metal is prepared by mixing a source of group VIB metal into a solvent, wherein:

the source of group VIB metal is selected from ammonium heptamolybdate, molybdenum trioxide and molybdic acid for molybdenum; and ammonium tungstate, tungstic acid and phosphotungstic acid for tungsten, and the solvent is selected from water and aqueous solution of ammonia, phosphoric acid or organic amine, wherein the organic amine is selected from monoethanol amine and diethyl amine.

In yet another feature of the present invention, the solution of group VIII metal is prepared by mixing a source of group VIII metal into a solvent; and the solution of the mixture of group VIII metal and group VIB metal is prepared by mixing the source of group VIII metal and group VIB metal into the solvent, wherein:

the source of group VIII metal is selected from nickel nitrate, nickel carbonate and nickel chloride for nickel; and cobalt nitrate, cobalt acetate and cobalt carbonate for cobalt;

the source of group VIB metal is selected from ammonium heptamolybdate, molybdenum trioxide and molybdic acid for molybdenum; and ammonium tungstate, tungstic acid and phosphotungstic acid for tungsten; and the solvent is selected from water, and aqueous solution of ammonia, phosphoric acid or organic amine wherein the organic amine is selected from monoethanol amine and diethyl amine.

In one feature of the present invention, the alumina support is gamma-alumina support and the alumina support is prepared by a process comprising the steps of:

a) milling and peptizing an alumina powder with a dilute solution of mineral acid to obtain a dough;

b) extruding the dough in an extruder machine to obtain a wet extrudate;

c) drying the wet extrudate at a temperature in the range of 100 to 150° C. for 10 to 16 hours and then calcining at a temperature in the range of 400 to 600° C. for 4 to 8 hours to obtain extrudate of the alumina support.

In one feature of the present invention, the extrudate is in cylindrical, trilobe or quadralobe shape and having a diameter is in range of 1.2-1.5 mm.

In another feature of the present invention, the alumina is pseudo-boehmite alumina having more than 85% crystalline phases and surface area in the range 250-300 $m^2/g$ and pore volume 0.8 ml/g measured by low-temperature nitrogen adsorption after dehydrating the sample under vacuum.

In yet another feature of the present invention, the mineral acid is selected from nitric acid, sulfuric acid, and hydrochloric acid.

In yet another feature of the present invention, the prepared alumina support having bimodal porous network with pores having diameter both in the range 60-120 Å and >120 Å, with at least 20% of the pore volume from the pores having diameter in the range 60-120 Å and at least 40% of the pore volume from the pores having diameter >120 Å out of the total pore volume of the support.

In one of the feature of the present invention, the alumina support comprises two alumina materials with different porosity in which one type of alumina is with large porous texture which can give rise to pores of diameter >120 Å to the extent of at least 60% of total pore volume in oxide form and another alumina is having at least 60% pores in the range of 60-120 Å in oxide form.

BRIEF DESCRIPTION OF DRAWING

FIG. 1: illustrates relative distribution of sulphur compounds in feed and product stream.

DETAILED DESCRIPTION OF THE INVENTION

The present invention relates to a method of preparation of a catalyst for simultaneously carrying out the selective hydrogenation of diolefins and combination reaction of light sulfur compounds like mercaptans with olefinic compounds to form a heavier sulfur compounds in the gasoline streams. The catalyst comprises of at least one metal from group VIB and at least one metal from group VIII mounted on the surface of a gamma-alumina support. The catalyst prepared according to the current invention is having two types of metal active sites, one comprising of only group VIB metals such as molybdenum and tungsten, whereas other type of active site is a group VIB metal promoted with group VIII metal like nickel and cobalt. The resultant varying metal profile enable to use this catalyst for two simultaneous reactions, wherein, the active sites of group VIB metal is responsible for the combination reactions of lighter sulfur compounds with olefinic compounds, whereas the group VIB metal promoted with group VIII metal are responsible for the hydrogenation of the diolefins.

The catalyst, according to present invention, is derived from commercially available cheap raw materials of each component. The gamma-alumina support is derived from one or more pseudo-boehmite alumina which is a precursor material mainly comprises of aluminium hydroxide and having alumina content in the range of 70-75 wt. % as oxide. The pseudo-boehmite alumina should be having more than 85% crystalline phases and surface area in the range 250-300 $m^2/g$ and pore volume 0.8 ml/g measured by low-temperature nitrogen adsorption after dehydrating the sample under vacuum.

The catalyst of the current invention can be prepared in any granular shapes, but more preferably as extrudates in cylindrical, trilobe or quadralobe shapes of 1.2-1.5 mm diameter. To prepare such extrudates, pseudo-boehmite alumina is first peptized with dilute solution of mineral acids like nitric acid, sulfuric acid, hydrochloric acid and then forced through an appropriate die of extruder machine. The resultant wet extrudates are dried 100-150° C. for 10-16 hours and calcined at 400-600° C. for at least 4-10 hours to obtain the Gamma-alumina support.

The alumina support thus obtained as extrudates give rise to a bimodal porous network with majority of pores are having diameter in the range of 60-120 Å and >120 Å. In one of the features of the present invention, the majority of pores of the bimodal porous network are having diameter in the range of 60-120 Å and 120-200 Å. According to the current invention, alumina support is having at least 20% of the total pore volume from the pores having diameter in the range 60-120 Å and at least 40% of the total pore volume from the pores having diameter >120 Å. More preferably, 30% of the total pore volume due to the pores having diameter in the range 60-120 Å and 50% of the total pore volume due to the pores having diameter >120 Å are desired in the alumina support. Alternatively, instead of using a single alumina with bimodal porous network, two alumina materials with different porosity can be admixed in suitable proportions so as to achieve a bimodal pore distribution as above. For instance, one type of pseudo-boehmite with large porous texture which can give rise to pores of diameter >120 Å to the extent of at least 60% of total pore volume in oxide form and another pseudo-boehmite having at least 60% pores in the range 60-120 Å in oxide form can be admixed in suitable proportions to obtain the support material of the present invention.

The catalyst prepared according to the current invention comprises of group VIB metal in the range 5 to 15 wt. % as metal oxide with respect to the total dry weight of final catalyst and the group VIII metal in the range 0.5 to 5 wt. % as metal oxide with respect to the total dry weight of final catalyst. Preferably, the group VIB metal used is molybdenum and tungsten whereas, the preferred group VIII metals are Ni and Co. The common raw materials used as the source of metal are one or more of the group comprising of ammonium hepta molybdate, molybdenum trioxide and molybdic acid for molybdenum, ammonium tungstate, tungstic acid and phosphotungstic acid for tungsten, nickel nitrate, nickel carbonate and nickel chloride for nickel, cobalt nitrate, cobalt acetate and cobalt carbonate for cobalt.

According to the further embodiment of the current invention, the catalyst preparation is carried out through a two consecutive impregnations on the alumina support wherein, in the first impregnation step, a solution of group VIB metal is impregnated on the alumina support and subsequently in the second impregnation step, a solution of either group VIII metal alone or a mixture group VIII and group VIB is impregnated on the product obtained after first impregnation. Prior to impregnation in the second stage, the metal solution used for the second impregnation is added with one or more of compounds selected from a group consisting of Nitrilotriacetic acid (NTA), Ethylene diamine tetraacetic acid (EDTA) and Ethylene dinitrilotetraacetic acid. The molar ratio of the organic additive to group VIII metal is in the range 0.1-2.0, more preferably in the range 0.5-1.0.

The preparation of catalysts comprises of steps for preparing the metal solutions by dissolving the required quantities of metal salts and chemicals in water or aqueous solution of ammonia, phosphoric acid or organic amines like monoethanol amine, diethyl amine etc. The impregnation of resultant solution having appropriate amounts of metals on the extrudate support can be carried out either by wet impregnation method or by incipient wetness method to obtain the final catalyst with desired metal loading. The wet catalyst obtained after first impregnation is dried at 100-150° C. for 8-12 hours and after second impregnation, the catalyst is again dried at 100-150° C. for 8-12 hours and then calcined at 400-500° C. for 2-4 hours to deposit the metal oxides on the support surface. The resultant finished catalyst is found to have pore volume to the extent of at least 60% from the pores of diameter in the range 60-120 Å, more preferably at least 70% from the pores of diameter in the range 60-120 Å out of total pore volume of the catalyst. The extent of pores of diameter >120 Å is in the range 10-20%.

Alternative to above preparation approach, pseudo-boehmite powders with different pore size distribution can be separately supported with different active metals species and then the mixture of these metal incorporated alumina powders is extruded to obtain a catalyst with the desired metal profile. In such case, one type of pseudo-boehmite, wherein at least 60% pores are in the range 60-120 Å in the oxide, was loaded with group VIB metal and the other pseudo-boehmite having larger porous texture, wherein pores of diameter >120 Å (or 120-200 Å) amounts to the extent of at least 60% of total pore volume in oxide form, was loaded with a mixture group VIII and group VIB. The resultant metal incorporated pseudo-boehmite powders are mixed thoroughly, extruded in cylindrical, trilobe or quadralobe shapes of 1.2-1.5 mm diameter, dried at 100-150° C. for 8-12 hours and then calcined at 400-500° C. for 2-4 hours.

The methodology of preparation employed according to current invention is suitable for giving a unique metal profile in the catalyst wherein the pores of alumina support in the diameter range 60-120 Å are deposited preferentially with group VIB metal whereas pore of diameter >120 Å are deposited preferentially with a combination of group VIB and VIII metals. Therefore, the catalyst of current invention is having two types of metal active sites, one comprising of mainly group VIB metals such as molybdenum and tungsten, whereas other type of active site is a group VIB metal promoted with group VIII metal like nickel and cobalt. The presence of two different types of metal active sites enables the catalyst to have multi-functionality in catalytic applications.

The catalyst of current invention is particularly useful for pretreatment of gasoline streams before subjecting it to hydrotreatment, wherein the gasoline streams comprise of monoolefins, diolefins, and light sulfur compounds like mercaptans and sulfides along with other hydrocarbons such as paraffins, aromatics, naphthenes etc. Typically, the diolefin content in gasoline varies in the range 1-6% and sulfur content in the range 0.1-0.7%. The content of olefinic compounds in gasoline streams are generally in the range 40-75%. The RON of refinery feed streams generally available is in the range 70-80. The catalyst of present invention is particularly useful for treating gasoline streams obtained from fluidized catalytic cracking (FCC) units, Resid fluidized catalytic cracking like INDMAX technology, Coker units and other heavy cut naphthas, which has a boiling range typically in the range 100-275° C.

The pretreatment of gasoline primarily includes the hydrogenation of diolefins as per the reaction pathway shown in Scheme 1. According to current invention, the active sites of catalyst comprising of group VIB metal promoted with group VIII metal are responsible for the transformation of 1,3-hexadiene to 3-hexene by the addition of hydrogen molecule as exemplified in Eq-1. Further hydrogenation of 3-hexene to n-hexane as represented by Eq-2 is undesired and is restricted with the special features of the invention in terms of pore size distribution and metal concentration profile. Therefore, advantageously, according to present invention, the active sites of the catalyst are highly efficient for selectively hydrogenating the diolefins to mono-olefins and thereby maximizing the retention of mono-olefins in the process and thereby to limit the loss of octane number of the gasoline.

Scheme 1: Hydrogenation of Diolefins

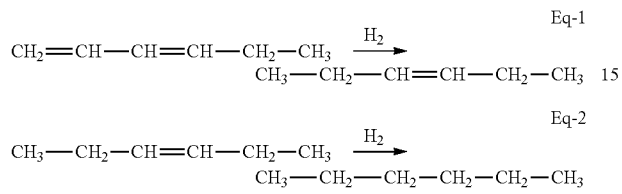

Simultaneously to above hydrogenation reaction, the pre-treatment process of gasoline also involves transformation of light sulfur compounds to heavier sulfur compounds as shown in Scheme 2. According to present invention, the active sites comprising preferentially of group VIB metal are responsible for the combination reactions of lighter sulfur compounds with mono-olefins to form heavier sulfur compounds. The light sulfur compounds of mercaptans and sulfides having boiling points lower than that of thiophene like methanethiol, ethanethiol, dimethylsulfide, methylethylsulfide, diethylsulfide etc, may be transformed into corresponding mercaptans or sulfides with higher molecular weight. The combination reaction of propane-2-thiol with 2-hexene to form a thioether molecule namely propylhexylsulfide is exemplified in Eq. 3. The shift of lighter sulfur compounds to heavier compounds enables to produce a desulphurized light gasoline fraction without any loss of mono-olefins, whereas the fraction with heavier sulfur compounds can be separated out and desulfurized in the subsequent hydrotreatment process.

Scheme 2: Reaction of sulfur compound with olefin

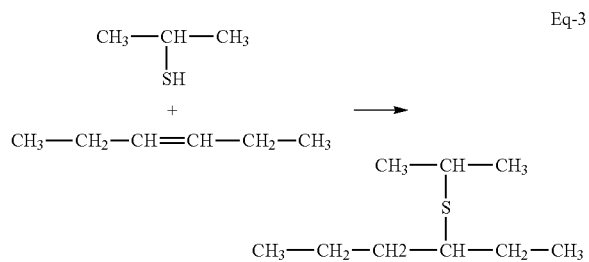

The catalyst prepared according to the current invention, as a result of having varying metal profile in the unique porous texture of the support, is found to exhibit high catalytic function for simultaneously carrying out the hydrogenation of diolefins and combination reactions of lighter sulfur compounds with olefins in the gasoline streams to form heavier sulfur compounds. Accordingly, the use of catalyst of current invention is highly advantageous to upgrade the gasoline feedstock and thereby effectively processed further to obtain gasoline fuel meeting the environmental regulations.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices and materials are described herein. It is to be understood that this disclosure is not limited to particular methods, and experimental conditions described, as such methods and conditions may vary.

Example 1

A. Preparation of Alumina Support:

Pseudo-boehmite alumina powder (1180 g, $Al_2O_3$, 72% w) is ball milled for 30 minutes. The powder is then mixed with a dilute solution of nitric acid (12 g, 520 ml de-mineralized water) and then mulled for 30 minutes in a mix-muller. The resultant dough is then extruded using an extruder machine with 1.2 mm trilobe die. The wet extrudates are dried at 120° C. for 12 hours and then calcined at 500° C. for 6 hours to obtain the gamma-alumina support.

B. Preparation of Catalyst:

According to current invention, the catalyst is prepared through a two stage impregnation process. For first impregnation, ammonium heptamolybdate (60 g, 98 wt. % purity) was dissolved in 800 mL of de-mineralized water and this solution was poured over the gamma-alumina support with continuous mixing in a rotating impregnation vessel in 15 minutes and continued mixing for another 15 minutes so as the extrudates to absorb the solution completely. The wet extrudates are dried at 120° C. for 10 hours.

For second impregnation, ammonium heptamolybdate (90 g, 98 wt. % purity) and nickel nitrate hexahydrate (120.9 g, 98% purity) were dissolved in 560 ml of de-mineralized water under stirring. To this solution added Nitrilotriacetic acid (NTA) (38.8 g, 99% purity) under stirring and warmed to 60-70° C. to obtain a clear solution. This solution was poured over the gamma-alumina support with continuous mixing in a rotating impregnation vessel in 15 minutes and continued mixing for another 15 minutes so as the extrudates of the first impregnation step to absorb the solution completely. The wet extrudates are dried at 120° C. for 10 hours and then calcined at 450° C. for 3 hours.

The physico-chemical properties of the alumina extrudate support and catalyst prepared are given in Table 1.

TABLE 1

| Physico-chemical properties of support and catalyst of current invention | | |
|---|---|---|
| Parameters | Support | Catalyst |
| BET Surface area, m²/g | 262 | 245 |
| Pore volume, ml/g | 0.8 | 0.7 |
| BJH Desorption Pore diameter | 122 | 80 |
| % Pore volume in pore dia. range | | |
| >120 Å | 58 | 10 |
| 60-120 Å | 33 | 80 |
| <60 Å | 9 | 10 |

Example 2

The catalyst is prepared as described in Example 1 except that entire quantity of the molybdenum source Ammonium heptamolybdate is dissolved in water and incorporated into the support in the first impregnation step and second impregnation is carried out with a solution having only nickel, wherein nickel nitrate hexahydrate is dissolved in water and is added with Nitrilotriacetic acid.

Example 3

The catalyst is prepared as described in Example 1 except that two alumina powders with different pore distribution are separately loaded with metals through the first and second impregnation steps. Each alumina is taken in equal proportions of quantities and total amount of the support material is kept the same as that of Example 1 to obtain identical overall metal loading in the catalyst. The first impregnation is carried out on alumina powder with 60-65% pores in the diameter range 60-120 Å, whereas second impregnation is performed on a different alumina powder having 60-65% pores in the diameter range >120 Å, employing impregnation solution having both Mo and Ni. Both aluminas have only <10% pores below the diameter 60 Å.

The individual metal incorporated alumina powders obtained after first and second impregnation are dried at 120° C. for 10 hours and then mixed. The mixture is homogenized through ball milling and extruded. The wet extrudates are dried at 120° C. for 10 hours and then calcined at 450° C. for 3 hours.

Example 4

Performance Evaluation of Catalysts

The catalytic activity of the catalysts is evaluated in the fixed bed tubular reactor with loading of 20 ml of the catalyst and using coker heavy naphtha. The process conditions employed for the test are given in Table 2. The product stream was analyzed for its composition and other characteristics for ascertaining the efficacy of the catalysts. The analysis results are given in Table 3. The feed and product gasoline streams are also analyzed using GC equipped with Sulfur Chemiluminescence Detector (SCD) for determining the relative distribution of sulfur compounds against elution temperature and the data are plotted in FIG. 1.

TABLE 2

Feed properties and Process conditions used for catalyst evaluation

| Process conditions | | Value |
|---|---|---|
| Temperature | ° C. | 170 |
| Pressure | bar | 20 |
| LHSV | 1/h | 2 |
| H$_2$/Oil ratio | Nm$^3$/m$^3$ | 50 |

TABLE 3

Typical Performance data of catalyst of current invention

| | | | | Product fractions | | |
|---|---|---|---|---|---|---|
| | | Feed | Product | C5-65° C. | 65-90° C. | 90° C.+ |
| Diolefins | wt % | 5.6 | 0.03 | 0.01 | 0.01 | 0.01 |
| Total Sulfur | ppmw | 4110 | 4110 | 30 | 1200 | 2880 |
| Octane Number (RON) | | 79.1 | — | 86.4 | — | — |
| Density at 15° C. | g/ml | 0.6862 | 0.6843 | 0.6715 | 0.7102 | 0.749 |
| NMR Analysis | | | | | | |
| Paraffins + Naphthenes | wt % | 29.6 | 39.3 | 33.5 | 41.3 | 52.5 |
| Aromatics | wt % | 5.6 | 5.7 | 2.6 | 7.6 | 11.8 |
| Olefins | wt % | 64.8 | 55 | 63.9 | 51.1 | 35.7 |

The hydrogenation of diolefins is a very fast reaction and is generally carried out using a suitable catalyst system at higher feed throughput and lower temperatures as compared to other hydrotreatment process. The reactions generally occur at the process conditions of temperature 160-200° C., pressure 20-25 bar, Liquid hourly space velocity (LHSV) of 2-4 h$^{-1}$ and hydrogen/hydrocarbon ratio of approximately 50 Nm$^3$/m$^3$. The catalyst of current invention is evaluated at typical operating conditions for ascertaining its performance. The performance data show that the catalyst of current invention is highly efficient to reduce the diolefin content to very low levels (as low as <0.05%) from 5.6 wt % in the feed. The product streams are fractionated and analyzed for its composition and properties. The lower cut fraction (C5-65° C.) is found to have only 30 ppmw of sulphur. The relative distribution of sulphur compounds in the feed and products is shown in FIG. 1. The sulphur compounds in the lower boiling fractions of the feed are found to be shifted to higher boiling heavier fractions in the product. Further, the olefin content as well as RON of this fraction is also quite promising to be used as a gasoline component. In summary, the ability of the catalyst prepared according to current invention to selectively hydrogenate diolefins without seriously reducing the olefins that present in lower fractions and to enable converting of light sulphur compounds into heavier higher boiling compounds is clearly evident from the properties of gasoline product obtained with the use of current catalyst. The lower cut fraction obtained with catalyst of current invention having lower sulphur and higher RON can be directly routed to the gasoline pool of the refinery without subjecting to any further upgradation.

Advantages of the Present Invention

The following are the technical advantages of the present invention over the prior art as disclosed above:
 Offers a method for preparing a catalyst for hydrogenation of diolefins in gasoline streams along with combination reactions of olefins with light sulfur compounds.

Enables to create different types of active sites in the same catalyst so as to enable the catalyst to have multi-functions for simultaneously carrying out different reactions.

To upgrade the gasoline feedstock and thereby effectively processed further to obtain fuels meeting the environmental regulations.

The invention claimed is:

1. A catalyst for simultaneously carrying out selective hydrogenation of diolefins and conversion of light sulfur compounds to heavier sulfur compounds in the gasoline streams, wherein the catalyst comprises:
   a metal complex impregnated over a first impregnated product, wherein the first impregnated product comprises at least one metal from group VIB metals impregnated over an alumina support, wherein the metal complex comprises a group VIII metal or a mixture of a group VIII metal and a group VIB metal and an organic additive, wherein the organic additive and the group VIII metal are in a molar ratio of 0.1-2.0, wherein
   and
   the catalyst has two metal active sites, wherein one metal active site comprises the group VIB metals and other metal active site comprises the mixture of the group VIII metal and the group VIB metal,
   wherein the group VIB metals in the catalyst is in a range of 5% to 15% by weight as a metal oxide with respect to total dry weight of the catalyst and the group VIII metal is in a range of about 0.5% to 5% by weight as a metal oxide with respect to the total dry weight of the catalyst.

2. The catalyst as claimed in claim 1, wherein the catalyst has at least 60% pore volume from pores of diameter in a range of 60-120 Å and has 10 to 20% pore volume from pores of a diameter >120 Å out of total pore volume of the catalyst.

3. The catalyst as claimed in claim 1, wherein the active site of the catalyst comprising group VIB metal is configured to combine lighter sulfur compound with olefins compounds and the active site of the catalyst comprising a mixture of group VIII and group VIB metals is configured to promote selective hydrogenation of the diolefins.

4. A method for preparation of a catalyst for simultaneously carrying out selective hydrogenation of diolefins in the gasoline streams and conversion of light sulfur compounds to heavier compounds, wherein the method comprises two consecutive impregnations steps of:
   (a) impregnating a solution of group VIB metal over an alumina support to obtain a first impregnated product;
   (b) adding a solution of either group VIII metal or a mixture of group VIII metal and group VIB metal to an organic additive to obtain a metal complex, wherein the organic additive and group VIII metal are in a molar ratio in a range of 0.1-2.0; and
   (c) impregnating the metal complex over the first impregnated product to obtain the catalyst.

5. The method as claimed in claim 4, wherein the group VIB metal is selected from molybdenum and tungsten and the group VIII metal is selected from nickel and cobalt.

6. The method as claimed in claim 4, wherein the first impregnated product of step (a) is dried at a temperature in a range of 100 to 150° C. for 8 to 12 hours.

7. The method as claimed in claim 4, wherein the step (b) is carried out a temperature in a range of 60-70° C.

8. The method as claimed in claim 4, wherein the catalyst obtained in step (c) is dried at a temperature in a range of 100 to 150° C. for 8 to 12 hours and then calcined at a temperature in a range of 400 to 500° C. for 2 to 4 hours.

9. The method as claimed in claim 4, wherein the organic additive is selected from nitrilotriacetic acid (NTA), ethylene diamine tetraacetic acid (EDTA) and ethylene dinitrilotetraacetic acid.

10. The method as claimed in claim 4, wherein the solution of group VIB metal is prepared by mixing a source of group VIB metal into a solvent, wherein:
    the source of group VIB metal is selected from ammonium heptamolybdate, molybdenum trioxide and molybdic acid for molybdenum; and ammonium tungstate, tungstic acid and phosphotungstic acid for tungsten, and
    the solvent is selected from water, aqueous solution of ammonia, phosphoric acid and an organic amine, wherein the organic amine is selected from monoethanol amine and diethyl amine.

11. The method as claimed in claim 4, wherein the solution of group VIII metal is prepared by mixing a source of group VIII metal into a solvent; and
    the solution of the mixture of group VIII metal and group VIB metal is prepared by mixing the source of group VIII metal and group VIB metal into the solvent, wherein:
    the source of group VIII metal is selected from nickel nitrate, nickel carbonate and nickel chloride for nickel; and cobalt nitrate, cobalt acetate and cobalt carbonate for cobalt;
    the source of group VIB metal is selected from ammonium heptamolybdate, molybdenum trioxide and molybdic acid for molybdenum; and ammonium tungstate, tungstic acid and phosphotungstic acid for tungsten; and
    the solvent is selected from water, aqueous solution of ammonia, phosphoric acid and an organic amine wherein the organic amine is selected from monoethanol amine and diethyl amine.

12. The method as claimed in claim 4, wherein the alumina support is gamma-alumina support and the alumina support is prepared by a process comprising the steps of:
    (a) milling and peptizing an alumina powder with a dilute solution of a mineral acid to obtain a dough;
    (b) extruding the dough in an extruder machine to obtain a wet extrudate; and
    (c) drying the wet extrudate at a temperature in a range of 100 to 150° C. for 10 to 16 hours and then calcining at a temperature in a range of 400 to 600° C. for 4 to 8 hours to obtain an extrudate of the alumina support.

13. The method as claimed in claim 12, wherein the extrudate is in a cylindrical, trilobe or quadralobe shape and has a diameter in a range of 1.2-1.5 mm.

14. The method as claimed in claim 12, wherein the alumina is pseudo-boehmite alumina having more than 85% crystalline phases and a surface area in a range of 250-300 m$^2$/g and a pore volume of 0.8 ml/g measured by low-temperature nitrogen adsorption after dehydrating the pseudo-boehmite alumina under vacuum.

15. The method as claimed in claim 12, wherein the mineral acid is selected from nitric acid, sulfuric acid, and hydrochloric acid.

16. The method as claimed in claim 12, wherein the alumina support has a bimodal porous network with pores having a diameter in a range 60-120 Å and >120 Å, with at least 20% of the pore volume from the pores having a diameter in a range of 60-120 Å and at least 40% of the pore volume from the pores having a diameter >120 Å out of the total pore volume of the alumina support.

17. The method as claimed in claim 4, wherein the alumina support comprises two alumina materials in equal proportions with a different porosity, wherein one alumina powder has 60-65% pores having a diameter in a range of 60-120 Å, and other alumina powder has 60-65% pores having a diameter >120 Å.

* * * * *